United States Patent
Yoo et al.

(10) Patent No.: US 7,162,059 B2
(45) Date of Patent: Jan. 9, 2007

(54) METHOD FOR IMPLEMENTING A NAVIGATION KEY FUNCTION IN A MOBILE COMMUNICATION TERMINAL BASED ON FINGERPRINT RECOGNITION

(75) Inventors: Wi-Hyun Yoo, Taegu-kwangyokshi (KR); Seok-Geun Lee, Kumi-shi (KR); Seung-Chul Choi, Taegu-kwangyokshi (KR)

(73) Assignee: Samsung Electronics Co., Ltd. (KR)

( * ) Notice: Subject to any disclaimer, the term of this patent is extended or adjusted under 35 U.S.C. 154(b) by 747 days.

(21) Appl. No.: 10/607,110

(22) Filed: Jun. 25, 2003

(65) Prior Publication Data
US 2005/0041841 A1   Feb. 24, 2005

(30) Foreign Application Priority Data
Jun. 26, 2002   (KR) ............................... 2002-35987

(51) Int. Cl.
*G06K 9/00*   (2006.01)
(52) U.S. Cl. ............... 382/124; 382/115; 382/201; 455/411; 342/357.1; 380/247
(58) Field of Classification Search ............... 382/115, 382/124, 125, 201; 340/5.82, 5.53, 5.2, 5.8; 455/410, 411, 566, 73; 345/173, 175, 169, 345/168; 709/217; 342/357.1; 380/220, 380/247
See application file for complete search history.

(56) References Cited

U.S. PATENT DOCUMENTS

| 6,298,230 | B1 | | 10/2001 | Schneider-Hufschmidt |
| 6,657,538 | B1 | * | 12/2003 | Ritter ..................... 340/5.81 |
| 6,754,364 | B1 | * | 6/2004 | Yacobi .................... 382/100 |
| 6,792,287 | B1 | * | 9/2004 | Tuomela et al. ......... 455/556.1 |
| 6,853,988 | B1 | * | 2/2005 | Dickinson et al. ............ 705/75 |
| 6,947,580 | B1 | * | 9/2005 | Kinsella .................... 382/124 |
| 6,970,580 | B1 | * | 11/2005 | Kies ........................ 382/118 |
| 2002/0052192 | A1 | * | 5/2002 | Yamazaki et al. .......... 455/411 |
| 2002/0135565 | A1 | * | 9/2002 | Gordon et al. ............. 345/169 |
| 2002/0168961 | A1 | * | 11/2002 | Ohba ........................ 455/410 |

FOREIGN PATENT DOCUMENTS

CN   1503956 A   6/2004

* cited by examiner

*Primary Examiner*—Sheela Chawan
(74) *Attorney, Agent, or Firm*—The Farrell Law Firm (57) ABSTRACT

A method for implementing a navigation key function in a mobile communication terminal using fingerprint-recognition. The mobile communication terminal includes a fingerprint-recognition sensor divided into a plurality of image detection blocks. The method comprises recognizing a fingerprint over at least one of the plurality of image detection blocks, obtaining a directional characteristic corresponding to a direction indicated by the at least one of the plurality of image detection blocks that has recognized the fingerprint, and then determining a directional value based on the obtained directional characteristic to perform a corresponding directional process.

13 Claims, 8 Drawing Sheets

METHOD FOR IMPLEMENTING A NAVIGATION KEY FUNCTION IN A MOBILE COMMUNICATION TERMINAL BASED ON FINGERPRINT RECOGNITION

PRIORITY

This application claims priority to an application entitled "METHOD FOR IMPLEMENTING NAVIGATION KEY FUNCTION IN MOBILE COMMUNICATION TERMINAL BASED ON FINGERPRINT RECOGNITION", filed in the Korean Industrial Property Office on Jun. 26, 2002 and assigned Serial No. 2002-35987, the contents of which are hereby incorporated by reference.

BACKGROUND OF THE INVENTION

1. Field of the Invention

The present invention relates generally to a method for implementing a navigation key function in a mobile communication terminal, and more particularly to a method for implementing a navigation key function in a mobile communication terminal based on fingerprint recognition, wherein a fingerprint-recognition sensor serves as a navigation key.

2. Description of the Related Art

Current mobile communication terminals (also referred to as "cellular phones") have functions such as a high-quality bell sound generator, a music player, and a camera. Further, a cellular phone having functions such as user identification based on biometric recognition and GPS (Global Positioning System) is gathering attention as a next-generation cellular phone.

In an identification method using fingerprint recognition in a cellular phone, an input fingerprint is recognized, and permission to use a cellular phone is determined based on the result of a check of whether the recognized fingerprint is identical with a stored user-fingerprint, thereby preventing its use by an unauthorized person.

Commonly, a menu selection key most frequently used by the user is disposed on the cellular phone at a position easy to reach by a fingerprint of a thumb for the authentication of a user. The menu selection key is not only used for selecting a menu item, but also for navigation between menu items. For implementing the navigation, the menu selection key is composed of a button-type navigation key that includes up/down/right/left navigation keys. Thus, there is a need to provide a configuration combining the fingerprint recognition function and the button-type navigation key. Such a configuration is disclosed in U.S. Pat. No. 6,298,230 B1. In this prior art, a fingerprint recognition sensor is integrated into the actuating surface of a button-type navigation key. This prior art has a problem in that a fingerprint recognition module is built-in together with a navigation-key function module, and the number of parts of the system increases. This makes it difficult to secure a built-in space for receiving the parts of various functions in the latest cellular phone, which tends toward a smaller size.

SUMMARY OF THE INVENTION

Therefore, the present invention has been made in view of the above problem, and it is an object of the present invention to provide a method for implementing a navigation key function in a mobile communication terminal based on fingerprint recognition, wherein the navigation direction is determined based on the direction toward which a recognized fingerprint is biased.

In accordance with one aspect of the present invention, the above and other objects can be accomplished in a method for implementing a navigation key function in a mobile communication terminal based on a fingerprint-recognition, the mobile communication terminal including a fingerprint-recognition sensor. The method comprises: recognizing a fingerprint over at least one of the plurality of image detection blocks; obtaining a directional characteristic corresponding to a direction indicated by the at least one of the plurality of image detection blocks that has recognized the fingerprint; and determining a directional value based on the obtained directional characteristic to perform a corresponding directional process.

The present invention has an advantage in that the navigation direction is determined based on a biased direction of the fingerprint of a user, replacing the conventional button-type navigation key, and therefore the convenience of use is improved and the corresponding parts can be integrated, reducing the number of parts required in the cellular phone.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the annexed drawings. In the drawings, the same or similar elements are denoted by the same reference numerals even though they are depicted in different drawings.

Figure 1:
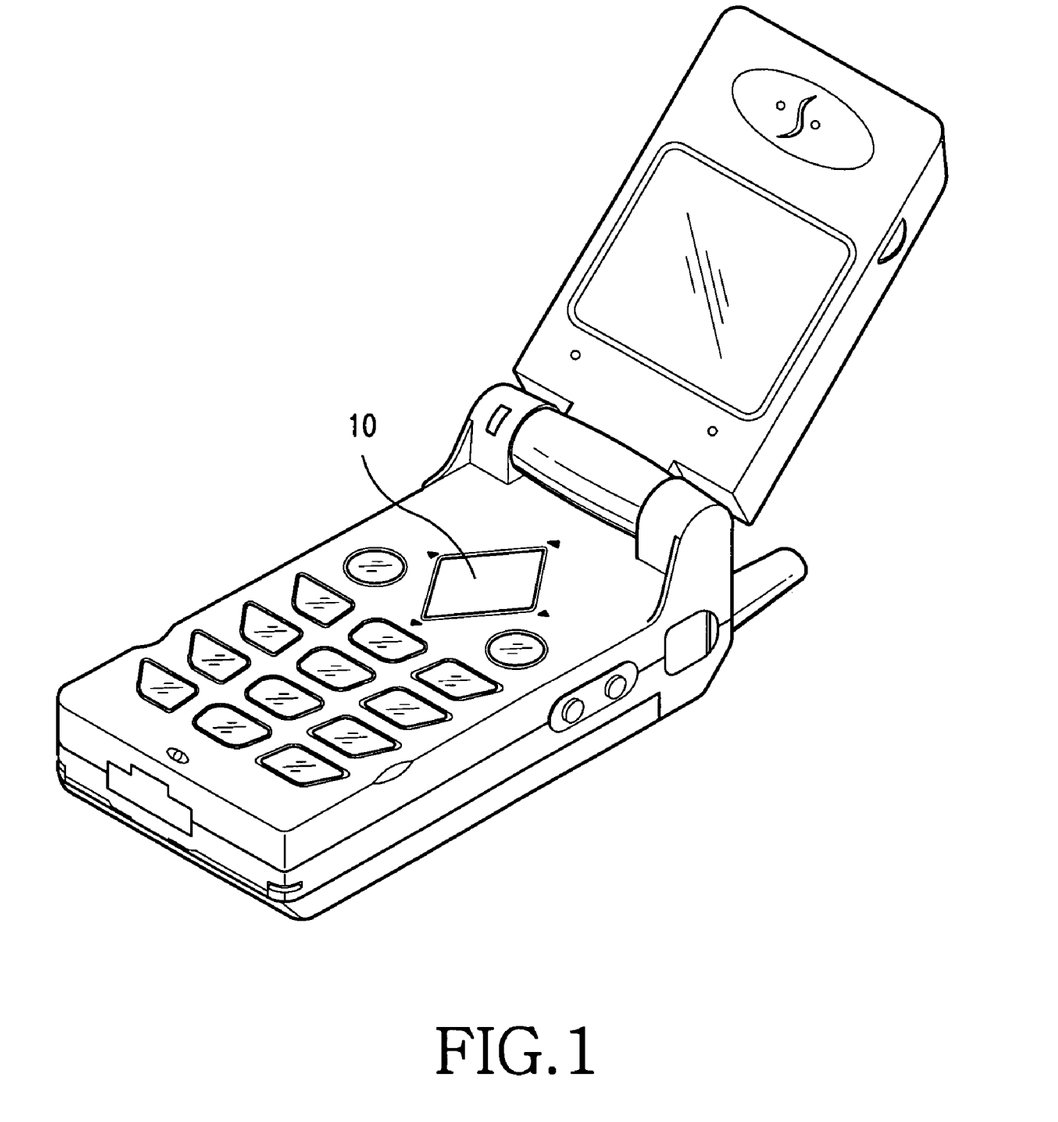
FIG. 1 is a perspective view of an exterior of a mobile communication terminal according to an embodiment of the present invention.

FIG. 1 is a perspective view of an exterior of a mobile communication terminal according to an embodiment of the present invention. A reference numeral 10 denotes a fingerprint detection unit that performs both user-authentication and selection of a navigation direction, based on a detected fingerprint.

Figure 2:
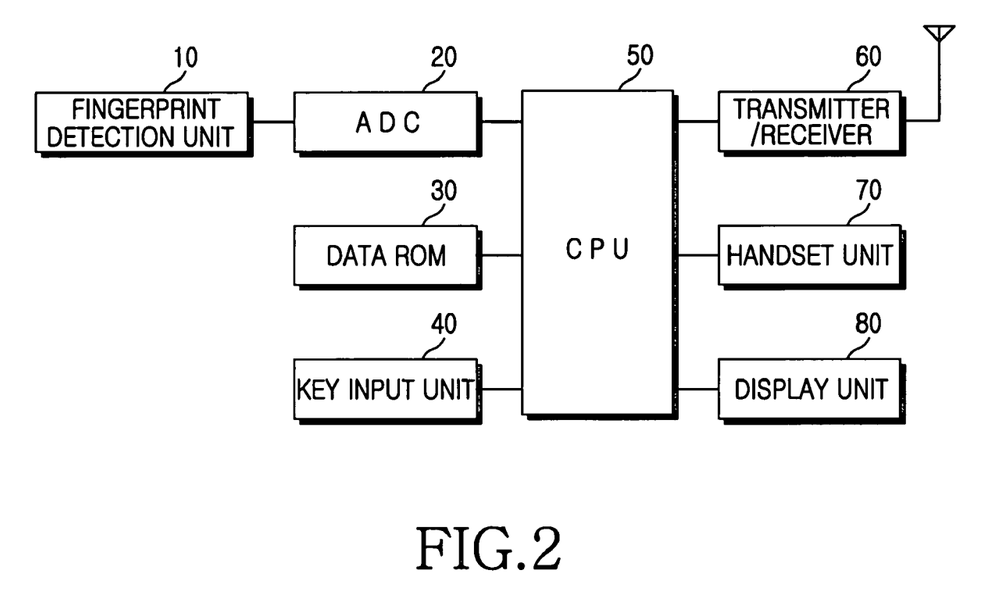
FIG. 2 is a block diagram of an internal configuration of the mobile communication terminal illustrated in FIG. 1.

FIG. 2 is a block diagram of an internal configuration of the mobile communication terminal illustrated in FIG. 1. In FIG. 2, an ADC (Analog-to-Digital Converter) 20, a data ROM 30, a key input unit 40, a receiver/transmitter 60, a handset unit 70, and a display unit 80 are connected to a CPU 50. In this embodiment, the fingerprint detection unit 10 is provided separately from the key input unit 40 in order to perform a function corresponding to the conventional button-type navigation key, as well as detect an input fingerprint for user fingerprint-authentication. Although not described in this embodiment, a pressure detection sensor may be additionally connected to the ADC 20 to detect the pressure of the fingerprint simultaneously with the input of the pattern of the fingerprint and obtain an optimal input value from the detection result to select the navigation direction more accurately. In addition, the fingerprint detection unit 10 may be built on the inside of the display unit 80. In this case, a navigation direction is selected by putting a fingerprint to the surface of the display unit 80.

This method for first authenticating a fingerprint, and then determining a navigation direction based on fingerprint detection according to an embodiment of the present invention includes at least six steps as follows.

In a first step, the power of the cellular phone is turned on and then the cellular phone initialized. After the initialization, if the phone is locked, a fingerprint or a secret number is input and compared with a stored fingerprint or secret number.

In a second step, if the two fingerprints or secret numbers are identical, in response to a key input or a fingerprint input, it is checked whether the operation of the cellular phone is in a fingerprint mode.

In a third step, if the result in the second step is that the operation of the cellular phone is not in a fingerprint mode, then the phone is in a key-input setting mode and a process corresponding to the key input is performed. When the operation of the cellular phone is in the fingerprint mode, it is checked whether there is an existing registered fingerprint in a memory of the cellular phone.

In a fourth step, if the result in the third step is that there is no existing registered fingerprint, first and second fingerprints are input and compared for registration. If the two input fingerprints are identical, the input fingerprints are registered. If the result in the third step is that there is an existing registered fingerprint, an activation fingerprint is input. When the input activation fingerprint is identical with the existing registered fingerprint, it is checked whether the operation of the cellular phone is in a fingerprint modification mode. If this checked result is affirmative, a fingerprint to be modified is selected.

In a fifth step, when the phone is in the fingerprint modification mode, it is checked whether the operation is in an additional fingerprint registration mode. When the operation of the cellular phone is in the additional fingerprint registration mode, a fingerprint to be additionally registered is selected. When the operation is not in the additional fingerprint registration mode but in a fingerprint deletion mode, the registered fingerprint is deleted.

In a sixth step, when the operation of the cellular phone is not in the key-input setting mode but in a fingerprint authentication mode, a fingerprint authentication process is performed for the input fingerprint. When it is confirmed that the input fingerprint is identical with a registered fingerprint, the authentication process is completed. After the completion of the authentication process, the CPU enters a standby state, waiting for further commands to be input.

When the operation of the cellular phone is not in the fingerprint authentication mode, i.e., a fingerprint has been-authenticated and the phone is operational, the directional characteristic of the subparts of the detected fingerprint is obtained for determining the navigation direction.

FIGS. 4A to 4D are views of an example of a specific-region detection method according to the present invention, which uses fingerprint images detected by the fingerprint input sensor of the present invention. In FIGS. 4A, 4B, 4C, and 4D exemplary views of images corresponding to left, right, up, and down-direction input keys are illustrated, respectively. In this example, an entire image-detection region is divided into nine blocks, and then the values detected in three up/left/down/right blocks are summed separately as shown in the following equations, and a direction corresponding to the highest summed value is selected as a navigation direction. In this example, the average value for each 5×5 pixels among 220×220 pixels is calculated, and a direction corresponding to a block having the highest detected value, among the nine blocks, is selected as a navigation direction.

$$\text{Position } [i, j] = \sum_{x=i}^{i+10} \sum_{y=i}^{j+10} \text{pixel\_value } [x, y]_{i,j=10,110,200} \quad (1)$$

$P_{UP}$=Position[10,10]+Position[110,10]+Position[200,10]

$P_{LEFT}$=Position[10,10]+Position[10,110]+Position[10,200]

$P_{DOWN}$=Position[10,200]+Position[110,200]+Position[200,200]

$P_{RIGHT}$=Position[200,10]+Position[200,10]+Position[200,200]

More specifically, this method selects 9 blocks from a fingerprint input region and check whether there exits a fingerprint at the selected blocks. Thus, if the fingerprint is located at the upper 3 blocks, the direction is upward. However, if the fingerprint is located at the left side, the direction is left. The coordinate of each of 9 blocks becomes 10×10 region at the starting point of (10,10), (10,110), (10,200), (110,10), (110,110), (110,200), (2000,10), (200,110), (200,200). Each block represents Position [10,10], Position [10,110], etc., in each equation. Further, $P_{up}$ indicates the upper part is the sum of Position [10,10], Position [110,10] and Position [200,10]. Position [x,y] is the sum of pixel values within 10×10 block of a coordinate x,y. In the equation of the preset application, it is disclosed by 2 sigmas. Please note that in the values of $P_{up}$, $P_{left}$, $P_{right}$, $P_{down}$ indicate each direction, i.e., the portion having the largest black part becomes the direction thereof.

FIGS. 5A to 5D are exemplary views of a method of processing an image detected by a fingerprint sensor using an entire sub-region detection method according to the present embodiment of the present invention. The method is similar to the method of FIG. 4, but the detection is performed for the entire pixels according to the following equation. In FIGS. 5A, 5B, 5C, and 5D, exemplary views of images corresponding to left, right, up, and down-direction input keys are illustrated, respectively.

$$\text{Position } [i, j] = \sum_{x=i}^{i+20} \sum_{y=i}^{j+20} \text{pixel\_value } [x, y]_{i, j=20, 40, 60 \ldots 220} \quad (2)$$

This method is similar to the above-referenced method. More particularly, please note that the entire region is divided into 10×10 blocks and then, checked whether the fingerprint exists. As to the direction, please note that when the entire image is diagonally divided, the sum of Position values corresponding to the upper part become $P_{up}$ and the sum of Position values corresponding to left side become $P_{left}$. And then, the portion having the largest black part becomes the direction thereof out of $P_{up}$, $P_{left}$, $P_{right}$, and $P_{down}$.

FIGS. 6A to 6D are exemplary views of a method of processing an image detected by the fingerprint sensor using an angle-based detection method according to the present embodiment of the present invention. In this method, one of the up/down/left/right navigation directions is determined such that, as expressed in equation (3), the input fingerprint-detection region is divided by radial lines at a multiple of angle 45° (i.e., 0°, 45°, 90°, ...) and 100 pixels on each radial line is detected for selecting radial lines on which 25 pixels or more corresponding to the fingerprint are detected, and a direction corresponding to a radial line having the highest detection values is determined as a navigation direction. In FIGS. 6A, 6B, 6C, and 6D, exemplary views of images corresponding to left, right, up, and down-direction input keys are illustrated, respectively.

$$\text{Position } [L] = \sum_{i=24}^{124} \text{pixel\_value } [L]|_{L=0, 45, 90 \ldots 315} \quad (3)$$

$P_{UP}$=Position[45]+Position[90]+Position[135]

$P_{LEFT}$=Position[135]+Position[180]+Position[225]

$P_{DOWN}$=Position[225]+Position[270]+Position[315]

$P_{RIGHT}$=Position[315]+Position[0]+Position[45]

This method is to set a sampling area in a fingerprint image at the 8 directions. The sum of 3 values at each direction becomes $P_{up}$, $P_{left}$, $P_{right}$, and $P_{down}$. Herein, the portion having the largest black part becomes the direction thereof. The sampling area refers to a part indicating up and down, left and right, and diagonal.

FIGS. 7A to 7D are exemplary views of a method of processing an image detected by the fingerprint sensor using another angle-based detection method according to the present embodiment of the present invention. In this method, one of the up/down/left/right navigation directions is determined such that, as expressed in equation (4), the input fingerprint-detection region is divided by radial lines at a multiple of angle 15° (i.e., 0°, 15°, 30°, ...) and 100 pixels on each radial lines is detected for selecting radial lines on which 25 pixels or more corresponding to the fingerprint are detected, and a direction corresponding to a radial line having the highest detection values is determined as a navigation direction. In FIGS. 7A, 7B, 7C, and 7D, exemplary views of images corresponding to left, right, up, and down-direction input keys are illustrated, respectively.

$$\text{Position } [L] = \sum_{i=24}^{124} \text{pixel\_value } [L]|_{L=0, 15, 30 \ldots 345} \quad (4)$$

This method is sampling similarly to the above 8 directions detection method. However, this method is to subdivide the direction into 24 directions. Thus, the $P_{up}$ is the sum of 7 direction values, which is at the upward direction of the sampling area. In the $P_{up}$, $P_{left}$, $P_{right}$, and $P_{down}$, the portion having the largest black portion is the direction in which the fingerprint is imprinted.

FIGS. 8A to 8D are exemplary views of a method of processing an image detected by the fingerprint sensor using a center-of-weight detection method according to the present embodiment of the present invention. FIGS. 8A, 8B, 8C, and 8D are exemplary views showing images corresponding to left, right, up, and down-direction input keys, respectively. In this method, one of the up/down/left/right navigation directions is determined as follows. The detection region is divided into four regions corresponding to up/down/left/right navigation directions, respectively, with two diagonal lines. The fingerprint-detection is performed at each 25 pixels. The detected values are summed for a specific x-coordinate and a specific y-coordinate, respectively, as expressed by the following equation. A diagonally-divided portion, which includes a center-of-weight position (x,y) corresponding to the highest detected values, is selected for determining a navigation direction.

$$\text{Position } [x] = \sum_{i=0}^{220} \text{pixel\_value } [x, i]_{i=0, 1, 2, \ldots 220} \quad (5)$$

$$\text{Position } [y] = \sum_{i=0}^{220} \text{pixel\_value } [y, i]_{i=0, 1, 2, \ldots 220} \quad (6)$$

This method is based on the assumption that the shape of the fingerprint is circular. The sum of values being at the interval of 25 pixels is firstly obtained at the horizontal direction of the fingerprint image. Herein, the highest value out of the obtained values is a vertical central coordinate. The sum of values being at the interval of 25 pixels is obtained at the vertical direction of the fingerprint image and the highest value out of the obtained values is the horizontal central coordinate. Accordingly, if the entire area is diagonally divided into and the coordinate value is located into upper part, the direction of the fingerprint becomes upward.

Hereinafter, the embodiment of the present invention is described in detail referring to FIGS. 1 to 8.

Figure 3A:
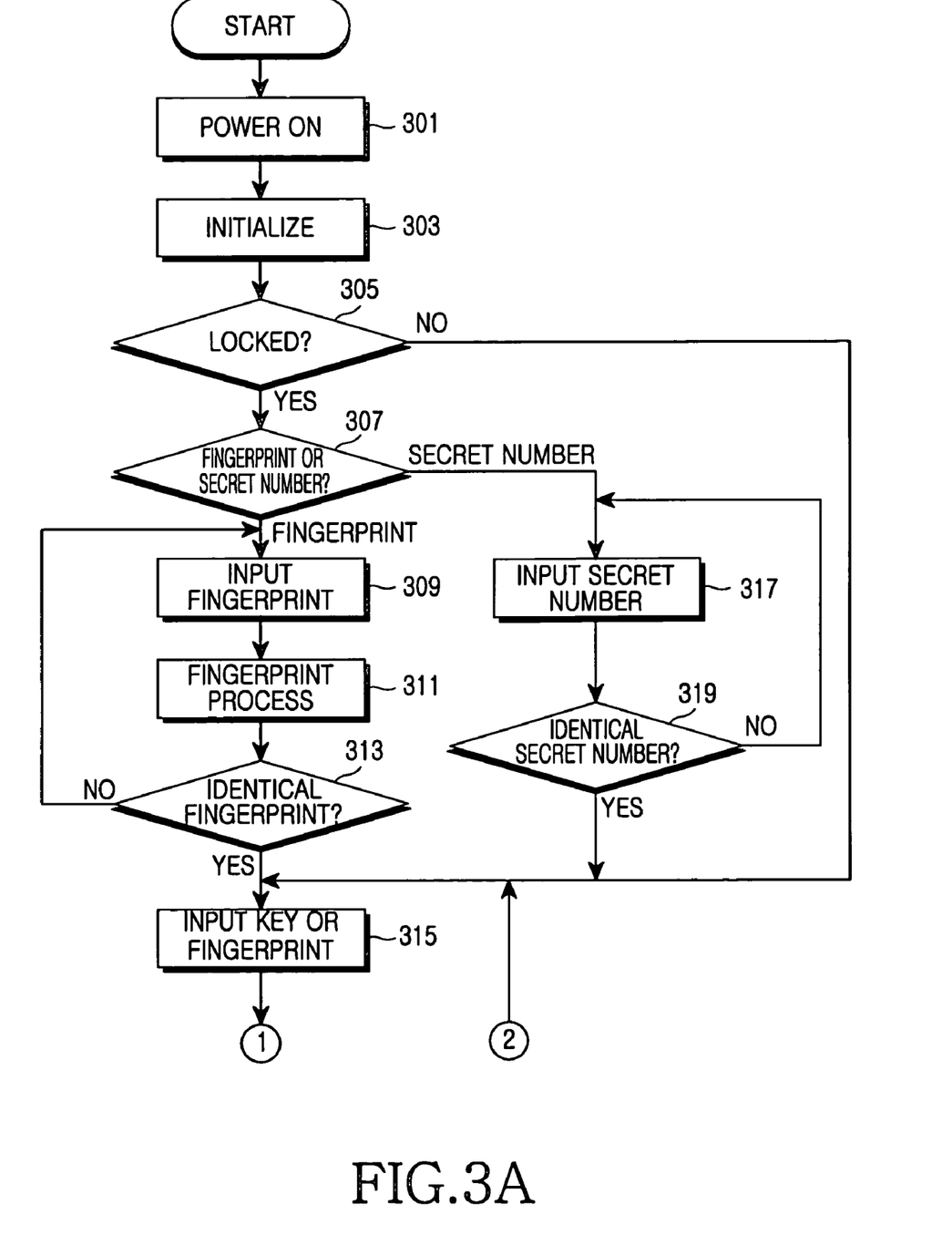
FIGS. 3A to 3C are flowcharts of a method for authenticating a fingerprint and determining a navigation direction, based on fingerprint detection according to an embodiment of the present invention.
Figure 3B:
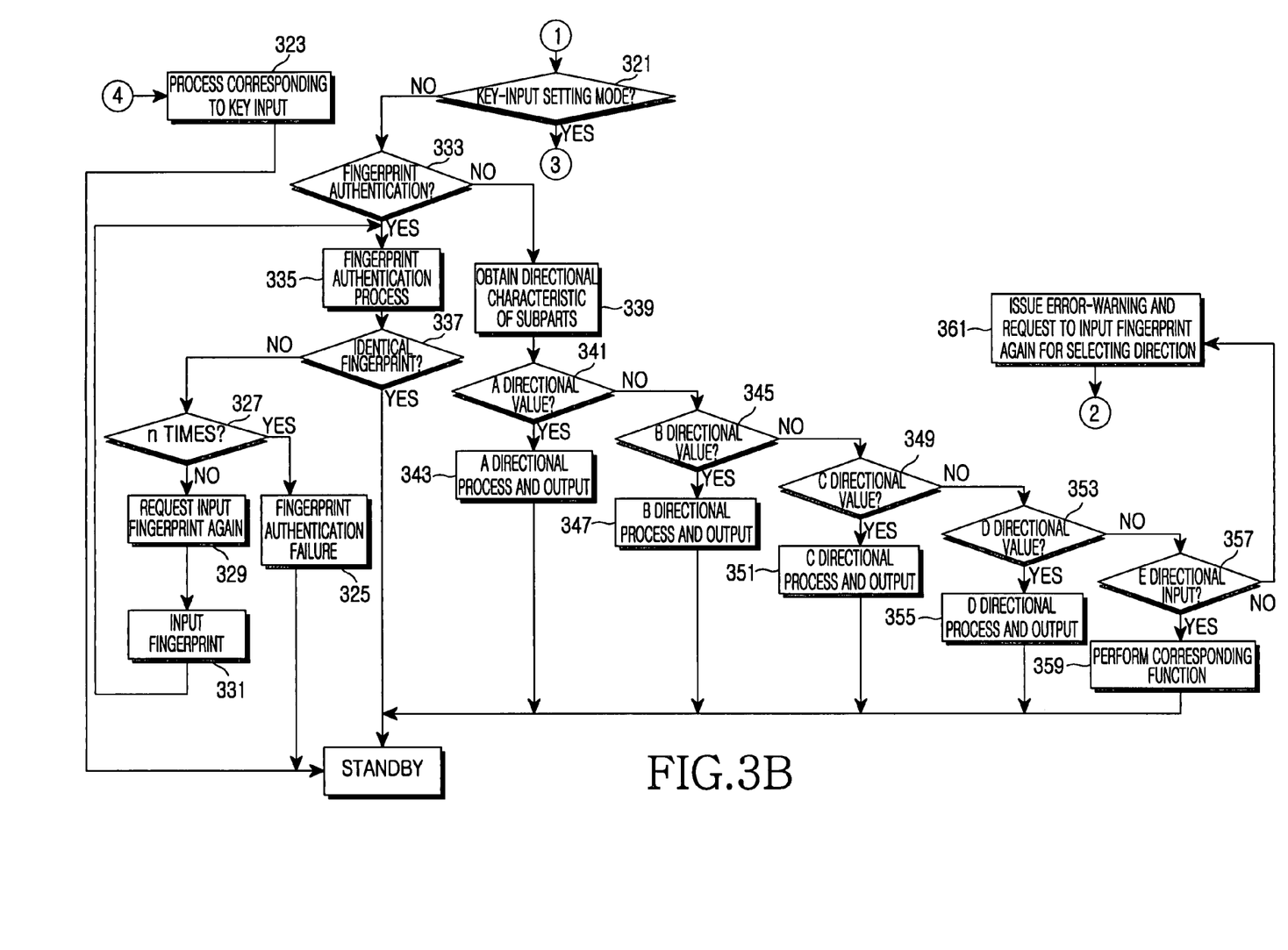
Figure 3C:
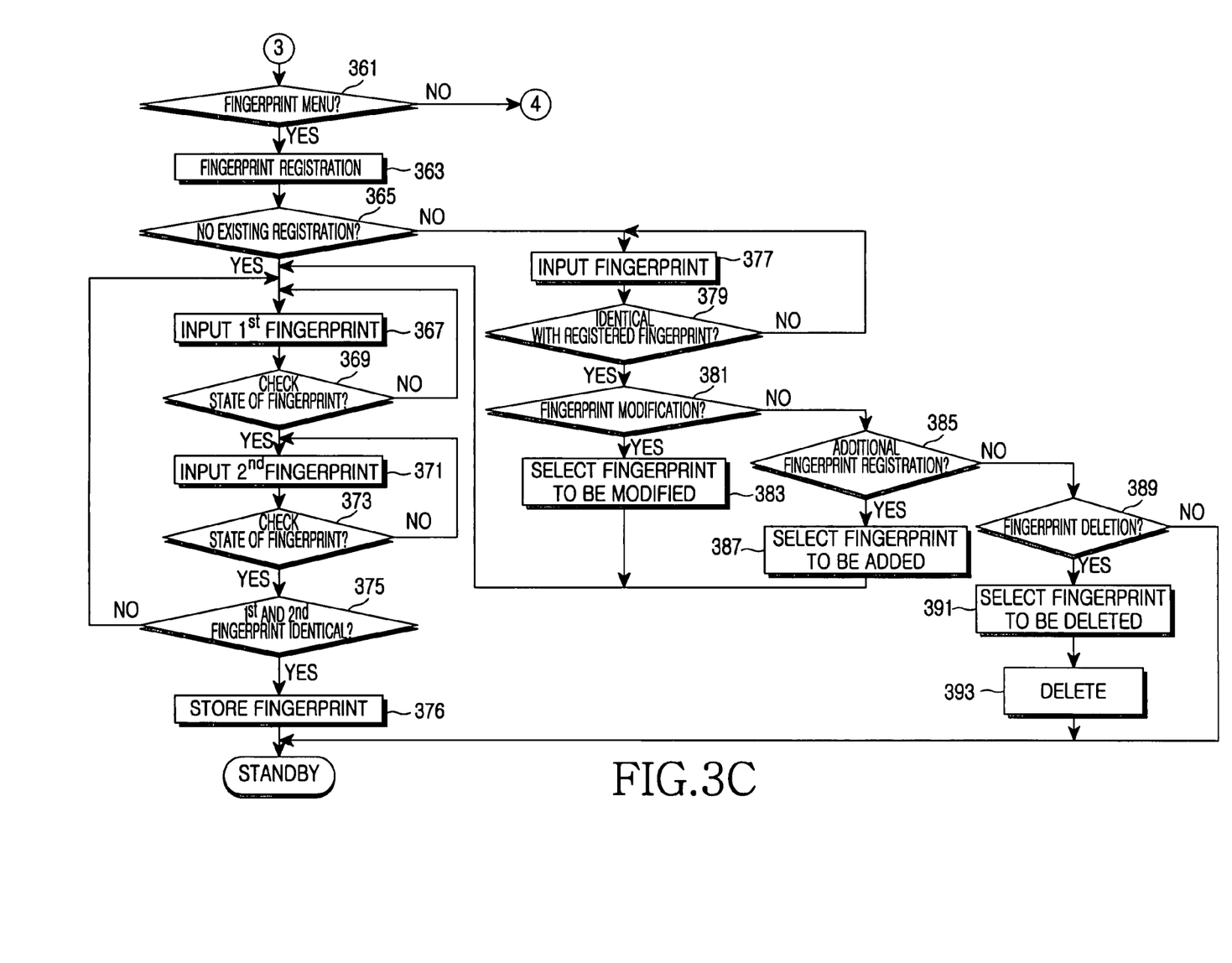
Figure 4:
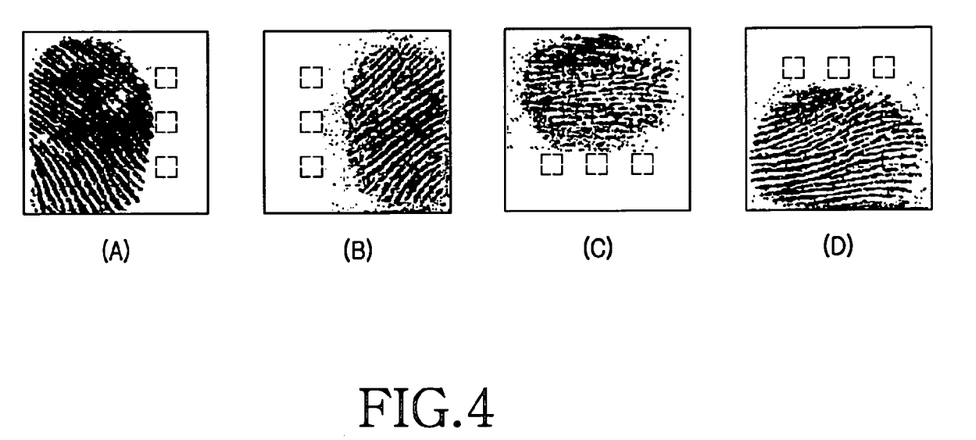
FIGS. 4A to 4D are views of an example of a method for detecting specific regions according to images obtained by the fingerprint input sensor of the present invention.
Figure 5:
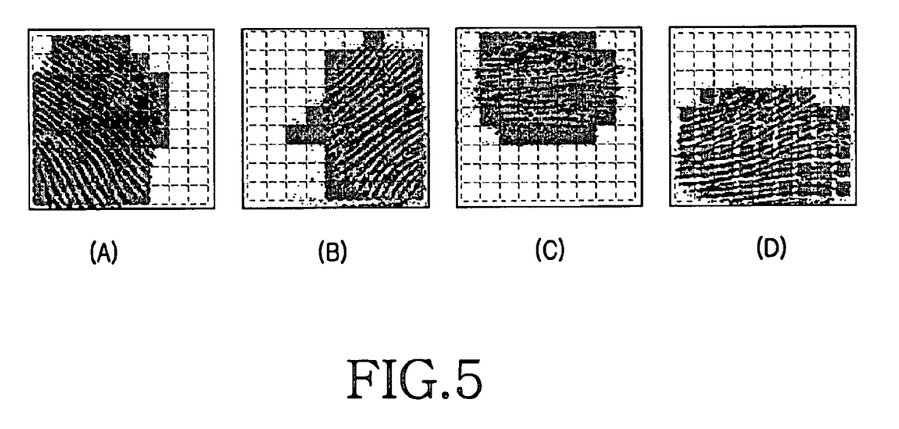
FIGS. 5A to 5D are exemplary views of a method of processing an image detected by the fingerprint sensor using an entire sub-region detection method according to the present embodiment of the present invention.
Figure 6:
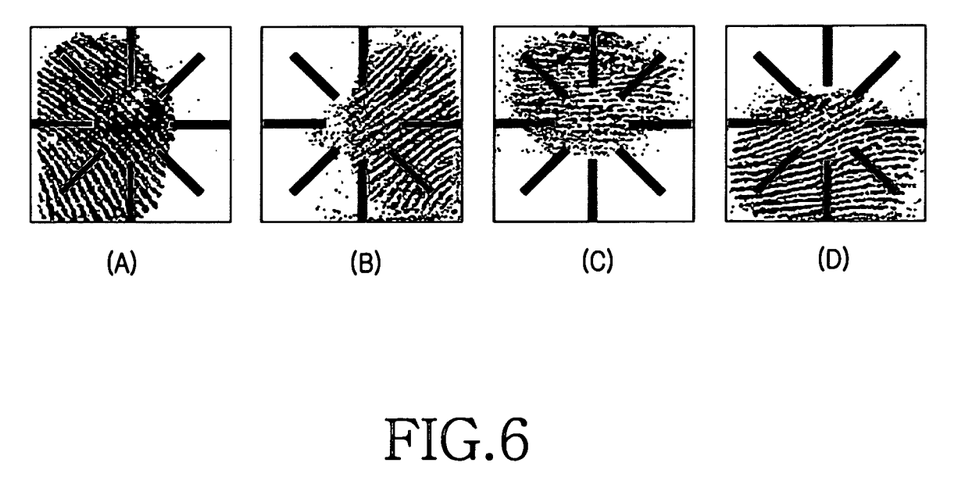
FIGS. 6A to 6D are exemplary views of a method of processing the image detected by the fingerprint sensor using an angle-based detection method according to the present embodiment of the present invention.
Figure 7:
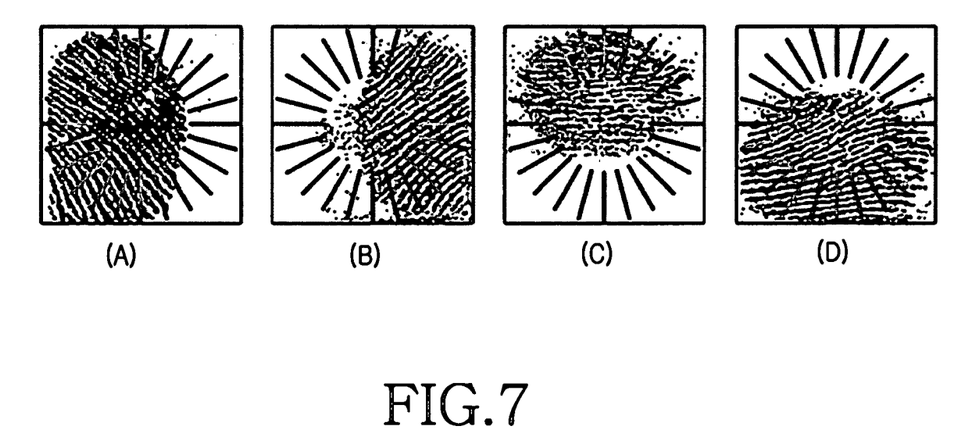
FIGS. 7A to 7D are exemplary views of a method of processing an image detected by the fingerprint sensor using another angle-based detection method according to the present embodiment of the present invention.
Figure 8:
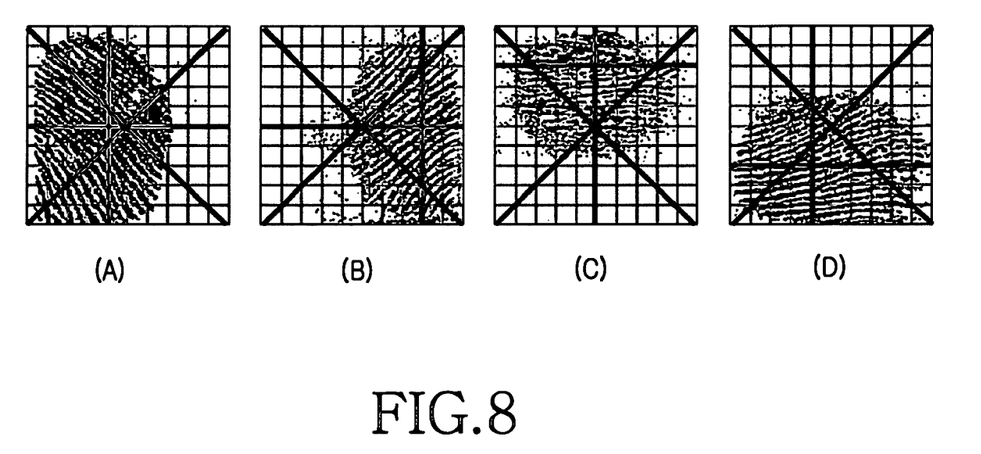
FIGS. 8A to 8D are exemplary views of a method of processing an image detected by the fingerprint sensor using a center-of-weight detection method according to the present embodiment of the present invention.

There are four basic functions in the method according to the present invention. The first function is to release a lock by inputting a fingerprint or secret number identical with a registered one, when the cellular phone is locked. The second function is to register the user fingerprint in order to prevent another person from using the cellular phone. The third function is to authenticate the user fingerprint, thereby preventing the other person from using the cellular phone. The fourth function is to determine a navigation direction based on the fingerprint FIGS. 3A to 3C are flowcharts of a method for authenticating a fingerprint and determining a navigation direction based on fingerprint detection according to an embodiment of the present invention. Using FIGS. 3A to 3C, the four functions in the method according to the present invention will be described below.

1) Lock Releasing Function

When the cellular phone is turned on in step 301 and initialized in step 303, the CPU 50 checks whether the cellular phone is locked in step 305. When the checked result is that the cellular phone is locked, it is checked whether the operation of the cellular phone is in a fingerprint or secret number input mode (307).

When the checked result of step (307) is that the operation of the cellular phone is in the secret number input mode, in response to an input of a secret number, it is checked whether the input secret number is identical with a registered secret number. On the other hand, when the checked result of step (307) is that the operation of the cellular phone is in the fingerprint input mode, in response to an input of a fingerprint (309), the fingerprint is processed in step (311). In step (311), it is checked whether the processed fingerprint is identical with a registered fingerprint, and when the checked result is that the two fingerprints are identical, the cellular phone is brought into an unlocked state in which anybody can operate it.

2) Fingerprint Registration Function

When the cellular phone is unlocked, it permits any functional key input. Therefore, in step (315), it permits a key input or a fingerprint input. In response to the key input of step (315), it is checked in step (321) whether the operation of the cellular phone is in the key-input setting mode. When the checked result is affirmative, it is checked in step (361) whether the operation of the cellular phone is in a fingerprint menu.

When the checked result of step (361) is that the operation of the cellular phone is not in the fingerprint menu, a function corresponding to the key input is performed, whereas when the checked result is that the operation of the cellular phone is in the fingerprint menu, a fingerprint is registered in step (363) and it is checked in step (365) whether there is an existing registered fingerprint. If there is no existing registered fingerprint, clear fingerprints are input about two times through a procedure of steps (367), (369), (371), and (373). When the input fingerprints are identical in step (375), the input fingerprints are set as a firstly-registered fingerprint.

On the other hand, when it is determined in the fingerprint registration mode that there is an existing registered fingerprint, a fingerprint is input in step (377) and a check is performed in step (379) whether the input fingerprint is identical with the existing registered fingerprint. When the two fingerprints are identical, it is checked in step (381) whether the operation of the cellular phone is in the fingerprint modification mode.

When the operation of the cellular phone is in the fingerprint modification mode, a fingerprint to be modified is selected. When the operation of the cellular phone is not in the fingerprint modification mode, but in an additional fingerprint registration mode (387) in step (385), a fingerprint to be added is selected. Through the steps from (367) to (376), a registration for fingerprints to be added or modified is completed and then the operation of the cellular phone enters a standby state. On the other hand, when the operation of the cellular phone is not in the additional fingerprint registration mode in step (385), it is checked in step (389) whether the operation of the cellular phone is in a fingerprint deletion mode. When the operation of the cellular phone is in the fingerprint deletion mode, a fingerprint to be deleted is selected and then deleted through the steps (391) and (393).

3) Fingerprint Authentication

When the operation of the cellular phone is not in the key-input setting mode in step (321), it is checked in step (333) whether the operation of the cellular phone is in the fingerprint authentication mode. If this checked result is affirmative, a fingerprint authentication process is performed in step (335) and then it is checked in step (337) whether the input fingerprint is identical with the registered fingerprint. When the two fingerprints are not identical, it is requested for the user to input again the user's fingerprint n times through steps (327), (329), and (331). When the newly input fingerprint and the registered fingerprint are identical, the fingerprint authentication is completed. But, when the fingerprints are not identical, the user is informed of the fingerprint authentication failure in step (325).

4) Selection of a Navigation Direction Based on Fingerprint

When the operation of the cellular phone is not in the fingerprint authentication mode in step (333), the directional characteristic of the subparts of the detected fingerprint is obtained based on the image of the fingerprint in step (339).

The obtaining of the directional characteristic in step (339) can be realized according to one of the exemplary methods shown in FIGS. 4 to 8. In steps (341), (345), (349), and (353), the directional values of up, down, left, and right navigation directions (A, B, C, and D directions) are determined based on the obtained directional characteristic. The directional values are processed in steps (343), (347), (351), and (355) and the processed results are displayed. In addition, it is checked in step (357) whether the obtained directional characteristic corresponds to the other direction value E. When the checked result is affirmative, the corresponding directional process is performed. When it is not affirmative, an error warning is issued, and it is requested for the user to input the fingerprint again for selecting the direction of navigation.

As apparent from the above description, the present invention has an advantage in that the navigation direction is determined based on a biased direction of the fingerprint of a user, replacing the conventional button-type navigation key, and therefore the convenience of use is improved and the corresponding parts can be integrated, reducing the number of parts.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for implementing a navigation key function in a mobile communication terminal using fingerprint-recognition, the method comprising the steps of:

including, in the mobile communication terminal, a fingerprint-recognition sensor divided into a plurality of image detection blocks;

recognizing a fingerprint over at least one of the plurality of image detection blocks;

obtaining a directional characteristic corresponding to a direction indicated by the at least one of the plurality of image detection blocks that has recognized the fingerprint; and determining a directional value based on the obtained directional characteristic to perform a corresponding directional process.

2. The method as set forth in claim 1, further comprising the step of authenticating a fingerprint of a user to prevent an unauthorized person from using the mobile communication terminal.

3. The method as set forth in claim 1, wherein the mobile communication terminal further includes a pressure detection sensor to detect a pressure of the fingerprint, simultaneously with the directional characteristic corresponding to the direction indicated by the at least one of the plurality of image detection blocks that has recognized the fingerprint.

4. A method for implementing a navigation key function in a mobile communication terminal based on a fingerprint-recognition, the method comprising the steps of:
   including, in the mobile communication terminal, a fingerprint-recognition sensor:
   authenticating a user by processing an image of a fingerprint input by the user, when the operation of the fingerprint-recognition sensor is in a user authentication mode;
   detecting subparts of the input fingerprint image when the operation of the fingerprint-recognition sensor is not in the user authentication mode but in a navigation key input mode;
   after dividing the processed image into subparts of predetermined size, determining a direction toward which the fingerprint image is biased with respect to the entire fingerprint-detection region, based on the processed image for each direction; and
   outputting a signal of the determined direction as a selected navigation direction and performing a control corresponding to the output signal.

5. The method as set forth in claim 4, further comprising the step of repeating inputting of fingerprint by n times upon fingerprint authentication if the input fingerprint is not identical with a registered fingerprint.

6. The method as set forth in claim 4, wherein the navigation direction is one of up, down, left, and right.

7. A method for implementing a navigation key function in a mobile communication terminal based on a fingerprint-recognition, the mobile communication terminal including a fingerprint-recognition sensor, the method comprising:
   an initial check step including the steps of (1) releasing a lock of the mobile communication terminal in response to input of a fingerprint or secret number, provided that the mobile communication terminal is locked, and (2) in response to a key or fingerprint input, checking whether the operation of the mobile communication terminal is in a key-input setting mode, provided that the terminal is unlocked or the lock is released;
   a registration step including (a) an initial registration step of performing an initial registration by inputting an identical fingerprint one or more times; (b) a registration-fingerprint input step of inputting a registered fingerprint; (c) an additional fingerprint registration step of additionally registering a fingerprint; and (d) a fingerprint deletion step of deleting a registered fingerprint, provided that the operation of the terminal is in a fingerprint registration mode; and
   a directional process step of (i) checking whether the input fingerprint is identical with a registered one when the operation of the terminal is in a fingerprint authentication mode, (ii) obtaining a directional characteristic of subparts of the input fingerprint when the operation of the terminal is not in the fingerprint authentication mode, and (iii) determining a fingerprint input navigation direction based on the obtained directional characteristic.

8. The method as set forth in claim 7, further comprising the step of passing through n times repeated input of fingerprint upon fingerprint authentication if the input fingerprint is not identical with a registered fingerprint.

9. The method as set forth in claim 7, wherein the navigation direction is one of up, down, left, and right.

10. The method as set forth in claim 7, wherein in the directional process step are selected n blocks in the input fingerprint-detection region for the input fingerprint and then a direction corresponding to a block having a highest summed value according to the following equations, among the n blocks, is selected as a corresponding navigation direction ($P_{UP}$, $P_{LEFT}$, $P_{DOWN}$, $P_{RIGHT}$):

$$\text{Position } [i, j] = \sum_{x=i}^{i+k} \sum_{y=j}^{j+k} \text{pixel\_value } [x, y] \Big|_{i,j=k,11k,10k} \quad \text{(by k pixels)}$$

$P_{UP}$=Position[k,k]+Position[11k,k]+Position[10k,k]
$P_{LEFT}$=Position[k,k]+Position[k,11k]+Position[k,20k]
$P_{DOWN}$=Position[k,20k]+Position[11k,20k]+Position[20k,20k]
$P_{RIGHT}$=Position[20k,k]+Position[20k,11k]+Position[20k,20k]

11. The method as set forth in claim 7, wherein in the directional process step the navigation direction ($P_{UP}$, $P_{LEFT}$, $P_{DOWN}$, $P_{RIGHT}$) is determined according to a highest value obtained by detecting all pixels of the n blocks.

12. The method as set forth in claim 7, wherein in the directional process step the navigation direction ($P_{UP}$, $P_{LEFT}$, $P_{DOWN}$, $P_{RIGHT}$) is determined such that, as expressed in the following equation, the input fingerprint-detection region is divided by radial lines at a multiple of angle A° and n pixels on each radial lines is detected for selecting radial lines on which n/4 pixels or more corresponding to the fingerprint are detected, and a direction corresponding to a radial line having a highest detection values is determined as a navigation direction:

$$\text{Position } [L] = \sum_{i=24}^{124} \text{pixel\_value } [L]\big|_{L=D, A°, 2A°, 3A°}$$

$P_{UP}$=Position[A]+Position[2A]+Position[3A]
$P_{LEFT}$=Position[3A]+Position[4A]+Position[5A]
$P_{DOWN}$=Position[5A]+Position[6A]+Position[7A]
$P_{RIGHT}$=Position[7A°]+Position[0]+Position[A°]

13. The method as set forth in claim 7, wherein in the directional process step the navigation direction ($P_{UP}$, $P_{LEFT}$, $P_{DOWN}$, $P_{RIGHT}$) is determined by summing detected values for a specific x-coordinate and a specific y-coordinate, respectively, as expressed by the following equation, and then selecting a diagonally-divided portion, which includes a center-of-weight position (x,y) corresponding to the highest detected values:

$$\text{Position } [x] = \sum_{i=0}^{220} \text{pixel\_value } [x, i]\big|_{i=0,1,2,\ldots 220}$$

$$\text{Position } [y] = \sum_{i=0}^{220} \text{pixel\_value } [x, i]\big|_{i=0,1,2,\ldots 220}.$$

* * * * *